3,399,017
FLAT FIELD METALLURGICAL MICROSCOPE OBJECTIVE

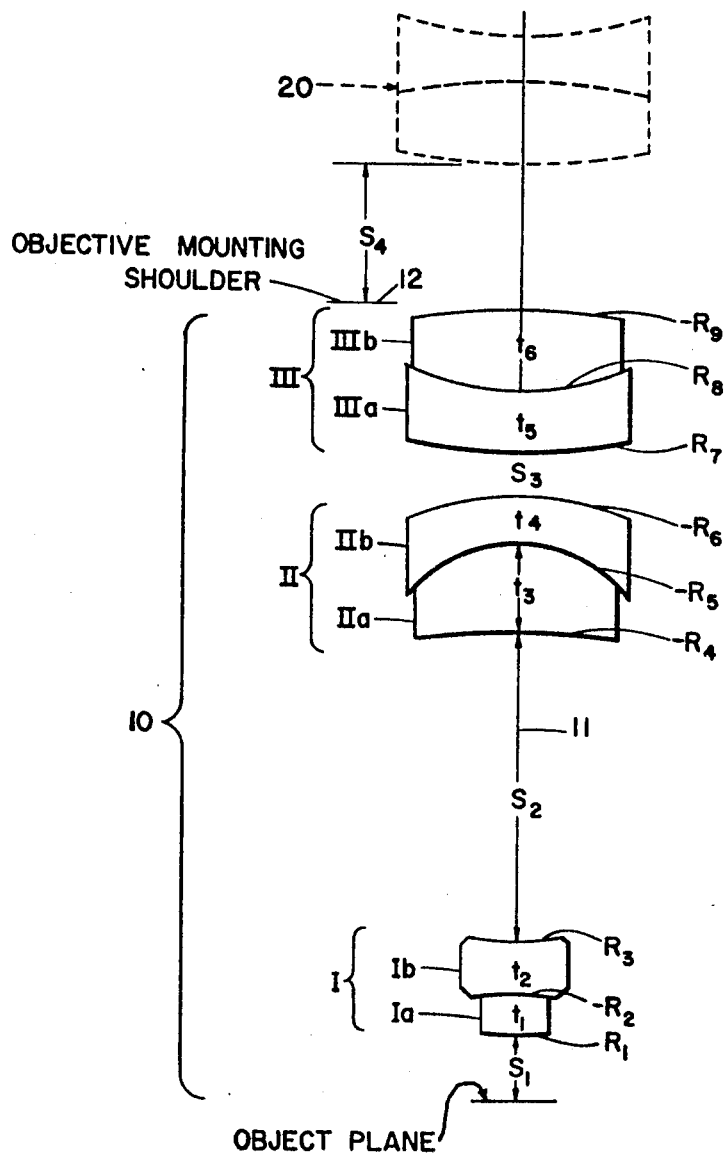

Duane E. Judd, Greece, N.Y., assignor to Bausch & Lomb Incorporated, Rochester, N.Y., a corporation of New York
Filed Aug. 25, 1965, Ser. No. 482,444
2 Claims. (Cl. 350—224)

The present invention relates to an optical objective for use on metallographs and the like and more particularly it relates to improvements therein.

Optical objectives of the kind generally described herebelow have been disclosed in a copending application of Harold E. Rosenberger, Ser. No. 408,875, filed Nov. 4, 1964, and having the same assignee, wherein is described in particular a superior microscope objective for use with biological specimens which are usually diascopically illuminated by transmitted light. It has been discovered that when such an objective is used in metallurgical microscopes where the specimen has a specular surface and is opaque, the image formed by specular light reflected from the specimen is degraded with respect to contrast of the critical image features by the simultaneous ghost reflections caused by the vertical illuminator at the air-glass lens surfaces in the objective. Furthermore, anti-reflection coating when applied to said air-glass lens surfaces may reduce but does not eliminate the above-described difficulty.

In view of the foregoing statements, it is an object of the present invention to provide a microscope semi-objective of the kind described in the above-mentioned patent appplication having together with a 5× corrector lens substantially 10× overall magnification wherein ghost reflections from air-glass lens surfaces therein are reduced to an innocuous condition.

It is a further object to provide such an objective having a very flat field and low distortion along with a superior degree of correction for astigmatism, coma and spherical image aberrations.

Further objects and advantages will be found in the arrangement and detailed structure of the parts of said objective by reference to the following specification and the accompanying drawing wherein the single figure is an optical diagram showing a preferred form of said invention.

The present microscope semi-objective per se is rated at 2× magnification and is designated in the drawing generally by the numeral 10. It is a member of a group of related metallographic semi-objectives having different magnification ratings which are interchangeably used in common with a single negative form corrector lens of 5× magnification as described in the aforementioned application of Rosenberger. Said corrector lens is designated by numeral 20 in the drawing and its magnification rating of 5×, when combined with the 2× magnification of the present semi-objective, produces a total magnification of 10× for the entire objective, and corrects certain aberrations in the imaging properties of said semi-objective in the same manner as recited in cited patent application. Corrector lens 20 is located on the optical axis 11 of the semi-objective at a fixed distance $S_4$ rearwardly from an objective shoulder 12.

According to the present invention, the form and arrangement of the lens members in said semi-objective as well as the constructional data, are so chosen as to achieve a flat field and good correction for astigmatism and coma without the aforesaid ghost reflections.

The semi-objective 10 per se has a magnification of 2.0× and is comprised of a front doublet lens designated I, an intermediate doublet lens designated II, and a rear doublet lens designated III, all of which are optically aligned on optical axis 11. Doublet lens I is spaced at an axial distance designated $S_1$ rearwardly of the object plane of the objective. Doublet lens II is spaced at an axial distance designated $S_2$ from lens I and is followed by an axial space designated $S_3$ which separates lenses II and III.

Front doublet lens I comprises a front double convex lens element Ia which lies in contact on its rear side with a double concave lens element designated Ib. The second doublet lens II comprises a front positive meniscus lens element designated IIa and a negative meniscus lens element designated IIb contacting the rear side of element IIa. In the rearmost doublet lens III, the front lens element is designated IIIa and is negative meniscus in form. Contacting the rear surface of lens element IIIa is a rear double convex lens element designated IIIb.

The equivalent focal lengths $F_I$, $F_{II}$ and $F_{III}$ of the successive doublet lenses I, II and III respectively have values as given in the table of mathematical statements herebelow as stated in terms of F which represents the equivalent focal length of the semi-objective 10 combined with the aforesaid 5× negative corrector lens, said values being practical and effective in producing within the ranges stated objectives having excellent performance characteristics.

$$1.5149F < F_I < 1.6411F$$
$$1.9296F < F_{II} < 2.0904F$$
$$1.8902F < F_{III} < 2.0478F$$

The constructional data relating to the successive lens elements Ia to IIIb of said semi-objective 10 are given herebelow in terms of F, said data including the successive lens radii designated $R_1$ to $-R_9$ wherein the minus (—) sign is used with surfaces whose centers of curvature lie on the entrant side of the vertex thereof, said data further including the equivalent focal lengths $F_{Ia}$, $-F_{Ib}$, $F_{IIa}$, $-F_{IIb}$, $-F_{IIIa}$ and $F_{IIIb}$ of the successive lens elements, and the successive axial thicknesses $t_1$ to $t_6$ respectively, as well as the successive air spaces $S_1$, $S_2$ and $S_3$ starting at the object plane, the minus (—) sign used with the focal length values meaning negative focal length, $$.4147F < F_{Ia} < .4493F$$
$$.4435F < -F_{Ib} < .4805F$$
$$.7603F < F_{IIa} < .8237F$$
$$1.4425F < -F_{IIb} < 1.5835F$$
$$1.5043F < -F_{IIIa} < 1.6297F$$
$$.8208F < F_{IIIb} < .8892F$$
$$.8849F < R_1 < .9211F$$
$$.4704F < -R_2 < .4896F$$
$$.5459F < R_3 < .5681F$$
$$3.5494F < -R_4 < 3.6006F$$
$$.3655F < -R_5 < .3805F$$
$$.6194F < -R_6 < .6446F$$
$$1.1005F < R_7 < 1.1455F$$
$$.5870F < R_8 < .6110F$$
$$1.7395F < -R_9 < 1.8105F$$
$$.1001F < t_1 < .1107F$$
$$.2726F < t_2 < .2754F$$
$$.2106F < t_3 < .2128F$$

.1055F<$t_4$<.1165F
.1501F<$t_5$<.1659F
.1876F<$t_6$<.2074F
.1422F<$S_1$<.1738F
.5463F<$S_2$<.6677F
.0949F<$S_3$<.1159F

The lens elements Ia to IIIb are made from glass having the refractive index thereof designated by $n_D$(Ia) to $n_D$(IIIb) respectively and having the Abbe numbers desnated $\nu$(Ia) to $\nu$(IIIb) respectively, the absolute values thereof being given in the table of mathematical statements herebelow, $1.7475 < n_D(Ia) < 1.7545$
$1.5110 < n_D(Ib) < 1.5170$
$1.5110 < n_D(IIa) < 1.5170$
$1.7166 < n_D(IIb) < 1.7234$
$1.6856 < n_D(IIIa) < 1.6924$
$1.5379 < n_D(IIIb) < 1.5441$
$27.74 < \nu(Ia) < 27.86$
$69.86 < \nu(Ib) < 70.14$
$69.86 < \nu(IIa) < 70.14$
$29.24 < \nu(IIb) < 29.36$
$30.84 < \nu(IIIa) < 30.96$
$59.78 < \nu(IIIb) < 60.02$ More specifically, the values of the constructional data for one successful form of the present invention are given substantially in terms of F in the table herebelow wherein the meaning of the symbolism remains the same as found hereabove, $F_I = 1.578F$
$F_{II} = 2.010F$
$F_{III} = 1.969F$
$F_{Ia} = .432F$
$-F_{Ib} = .462F$
$F_{IIa} = .792F$
$-F_{IIb} = 1.513F$
$-F_{IIIa} = 1.567F$
$F_{IIIb} = .855F$
$R_1 = .903F$
$-R_2 = .480F$
$R_3 = .557F$
$-R_4 = 3.530F$
$-R_5 = .373F$
$-R_6 = .632F$
$R_7 = 1.123F$
$R_8 = .599F$
$-R_9 = 1.775F$
$t_1 = .1054F$
$t_2 = .2740F$
$t_3 = .2117F$
$t_4 = .1110F$
$t_5 = .1580F$
$t_6 = .1975F$
$S_1 = .1580F$
$S_2 = .6070F$
$S_3 = .1054F$
$S_4 = .3499F$ The corresponding absolute values of the Abbe numbers $\nu$ and refractive index $n_D$ of the glass in said lens elements Ia to IIIb are given substantially in the table herebelow, $\nu(Ia) = 27.8$
$\nu(Ib) = 70.0$
$\nu(IIa) = 70.0$
$\nu(IIb) = 29.3$
$\nu(IIIa) = 30.9$
$\nu(IIIb) = 59.9$
$n_D(Ia) = 1.751$
$n_D(Ib) = 1.514$
$n_D(IIa) = 1.514$
$n_D(IIb) = 1.720$
$n_D(IIIa) = 1.689$
$n_D(IIIb) = 1.541$ From the foregoing description, it will be appreciated that there is here provided a semi-objective which is part of a compound objective having a corrector lens whereby the field is flattened to a superior degree and wherein all monochromatic image aberrations have been well corrected in accordance with the objects of the present invention.

Although only a single form of the invention has been shown and described in detail, other forms are possible and changes may be made in the details of construction within the limits claimed without departing from the spirit of the invention as defined in the claims here appended.

I claim:

1. A microscope semi-objective having a combined positive power of 10× when used with a rearwardly aligned negative corrector lens of 5× magnification, said semi-objective comprising a front doublet lens designated I consisting of a front double convex element designated Ia and a rear double concave element designated Ib in contact therewith, said front doublet lens having an equivalent focal length which is designated $F_1$, said front doublet lens I being located at an axial distance $S_1$ rearwardly from the object plane of said objective, a second doublet lens designated II consisting of a front positive meniscus element designated IIa and a rear negative meniscus element designated IIb in contact therewith, said second doublet lens being spaced rearwardly of lens I at an axial distance designated $S_2$ and having an equivalent focal length designated $F_{II}$, and a third doublet lens designated III consisting of a front negative meniscus element designated IIIa and a rear double convex element designated IIIb lying in contact therewith, said third lens III being spaced from lens II at an axial distance designated $S_3$ and having an equivalent focal length designated $F_{III}$, the specific values for the constructional data for said semi-objective being given substantially herebelow for the equivalent focal lengths $F_I$ to $F_{III}$, the successive axial thicknesses of the successive lens elements being designated $t_1$ to $t_6$, and the aforesaid air spaces $S_1$ to $S_3$, $F_I = 1.578F$     $t_1 = .1054F$
$F_{II} = 2.010F$     $t_2 = .2740F$
$F_{III} = 1.969F$     $t_3 = .2117F$
$F_{Ia} = .432F$     $t_4 = .1110F$
$-F_{Ib} = .462F$     $t_5 = .1580F$
$F_{IIa} = .792F$     $t_6 = .1975F$
$-F_{IIb} = 1.513F$     $S_1 = .1580F$
$-F_{IIIa} = 1.567F$     $S_2 = .6070F$
$F_{IIIb} = .855F$     $S_3 = .1054F$ wherein F designates the equivalent focal length of the semi-objective and corrector lens together, and further characterized by the refractive indices $n_D$(Ia), $n_D$(Ib), $n_D$(IIa), $n_D$(IIb), $n_D$(IIIa), $n_D$(IIIb) respectively of the successive lens elements Ia to IIIb, and Abbe numbers of the glasses from which said elements are formed being designated $\nu$(Ia), $\nu$(Ib), $\nu$(IIa), $\nu$(IIb), $\nu$(IIIa), $\nu$(IIIb) respectively, the specific absolute values thereof being given substantially in the table of mathematical statements herebelow, $n_D(Ia) = 1.751$     $(Ia) = 27.8$
$n_D(Ib) = 1.514$     $(Ib) = 70.0$
$n_D(IIa) = 1.514$     $(IIa) = 70.0$
$n_D(IIb) = 1.720$     $(IIb) = 29.3$
$n_D(IIIa) = 1.689$     $(IIIa) = 30.9$
$n_D(IIIb) = 1.541$     $(IIIb) = 59.9$ 2. A microscope objective having a combined positive power of 10× when used with a rearwardly aligned negative corrector lens of 5× magnification, said semi-objective comprising

- a front doublet lens designated I consisting of a front double convex element designated I$a$ and a rear double concave element designated I$b$ in contact therewith,
- said front doublet lens I being located at an axial distance S$_1$ rearwardly from the object plane of said objective,
- a second doublet lens designated II consisting of a front positive meniscus element designated II$a$ and a rear negative element designated II$b$ in contact therewith, said second doublet being spaced rearwardly of lens I at an axial distance S$_2$, and
- a third doublet lens designated III consisting of a front negative meniscus element designated III$a$ and a rear double convex element designated III$b$ lying in contact therewith, said third lens III being spaced from lens II at an axial distance designated S$_3$ and being spaced from said negative corrector lens by an axial distance designated S$_4$,
- the axial thicknesses of said elements successively from the front being designated $t_1$ to $t_6$ and the successive lens surfaces being designated R$_1$ to $-$R$_9$ numbering from the front, wherein the minus ($-$) sign used with the R values denotes that the center of curvature of such surface is located on the object side of its vertex,
- the specific values of the constructional data R$_1$ to $-$R$_9$, $t_1$ to $t_6$ and S$_1$ to S$_4$ being given in terms of F which represent the equivalent focal length of said semi-objective and corrector lens together in the table of mathematical statements herebelow,

| | |
|---|---|
| $R_1 = .903F$ | $t_2 = .2740F$ |
| $-R_2 = .480F$ | $t_3 = .2117F$ |
| $R_3 = .557F$ | $t_4 = .1110F$ |
| $-R_4 = 3.530F$ | $t_5 = .1580F$ |
| $-R_5 = .373F$ | $t_6 = .1975F$ |
| $-R_6 = .632F$ | $S_1 = .1580F$ |
| $R_7 = 1.123F$ | $S_2 = .6070F$ |
| $R_8 = .599F$ | $S_3 = .1054F$ |
| $-R_9 = 1.775F$ | $S_4 = .3499F$ |
| $t_1 = .1054F$ | | and further characterized by the successive lens elements I$a$ to III$b$ being formed from glass having refractive indices $n_D$(I$a$) to $n_D$(III$b$) respectively, and Abbe numbers (I$a$) to (III$b$) respectively which have specific absolute values as given substantially in the table of values herebelow,

| | |
|---|---|
| $n_D(Ia) = 1.751$ | $(Ia) = 27.8$ |
| $n_D(Ib) = 1.514$ | $(Ib) = 70.0$ |
| $n_D(IIa) = 1.514$ | $(IIa) = 70.0$ |
| $n_D(IIb) = 1.720$ | $(IIb) = 29.3$ |
| $n_D(IIIa) = 1.689$ | $(IIIa) = 30.9$ |
| $n_D(IIIb) = 1.541$ | $(IIIb) = 59.9$ |

References Cited

UNITED STATES PATENTS 2,158,202   5/1939   Schade.
3,118,964   1/1964   Buzawa.

FOREIGN PATENTS 945,467   1/1964   Great Britain.

DAVID SCHONBERG, *Primary Examiner.*

R. J. STERN, *Assistant Examiner.*

UNITED STATES PATENT OFFICE
CERTIFICATE OF CORRECTION

Patent No. 3,399,017

August 27, 1968

Duane E. Judd

It is certified that error appears in the above identified patent and that said Letters Patent are hereby corrected as shown below:

Column 2, line 59, "3.5494F" should read -- 3.4594F --.

Signed and sealed this 10th day of March 1970.

(SEAL)
Attest:

Edward M. Fletcher, Jr.
Attesting Officer

WILLIAM E. SCHUYLER, JR.
Commissioner of Patents